(12) United States Patent
Choi

(10) Patent No.: US 9,006,915 B1
(45) Date of Patent: Apr. 14, 2015

(54) MECHANICAL ENERGY STORAGE SYSTEM AND GENERATING METHOD USING THE SAME

(76) Inventor: Byung-Youl Choi, Paju (KR)

( * ) Notice: Subject to any disclaimer, the term of this patent is extended or adjusted under 35 U.S.C. 154(b) by 0 days.

(21) Appl. No.: 13/642,435

(22) PCT Filed: Aug. 6, 2012

(86) PCT No.: PCT/KR2012/006215
§ 371 (c)(1),
(2), (4) Date: Oct. 19, 2012

(87) PCT Pub. No.: WO2014/007418
PCT Pub. Date: Jan. 9, 2014

(30) Foreign Application Priority Data

Jul. 6, 2012 (KR) .................. 10-2012-0073815

(51) Int. Cl.
*F01B 11/00* (2006.01)
*F15B 5/00* (2006.01)
*F15B 13/02* (2006.01)
*H02K 7/18* (2006.01)

(52) U.S. Cl.
CPC ............. *F15B 5/00* (2013.01); *F15B 13/021* (2013.01); *F15B 13/027* (2013.01); *H02K 7/1815* (2013.01)

(58) Field of Classification Search
USPC ....................................... 290/1 R
See application file for complete search history.

(56) References Cited

U.S. PATENT DOCUMENTS

| | | | | |
|---|---|---|---|---|
| 3,400,636 | A * | 9/1968 | Schneider .................... | 91/452 |
| 3,507,580 | A * | 4/1970 | Howard et al. ............. | 417/231 |
| 3,693,351 | A * | 9/1972 | Minkus ........................ | 60/370 |
| 5,971,027 | A * | 10/1999 | Beachley et al. .......... | 138/31 |
| 7,605,482 | B2 * | 10/2009 | Brown et al. ............... | 290/1 R |
| 8,217,523 | B2 * | 7/2012 | Brown et al. ............... | 290/1 R |
| 2007/0085342 | A1 * | 4/2007 | Horianopoulos et al. .... | 290/1 R |
| 2009/0260935 | A1 * | 10/2009 | Avadhany et al. .......... | 188/297 |
| 2012/0119513 | A1 * | 5/2012 | McBride et al. ............ | 290/1 R |

FOREIGN PATENT DOCUMENTS

| | | | | |
|---|---|---|---|---|
| JP | 2012184791 | A | * | 9/2012 |
| KR | 2009128822 | A | * | 12/2009 |
| KR | 2010066426 | A | * | 6/2010 |

* cited by examiner

*Primary Examiner* — Joseph Waks
(74) *Attorney, Agent, or Firm* — Park Law Firm; John K. Park

(57) ABSTRACT

A mechanical energy storage system and method is provided, for storing a mechanical energy and generating electricity using the stored mechanical energy, which is small and can be used to charge portable digital devices such as smart phone, mobile phone, tablet PC, notebook, PMP, etc. An external mechanical force is used to compress high pressure gas charged in a pressure vessel, stored as a reacting force, a stored energy, due to proceeding of piston rod, which can be used as a power the devices whenever it is necessary, or so as to generate electricity by powering a gas generator.

14 Claims, 15 Drawing Sheets

MECHANICAL ENERGY STORAGE SYSTEM AND GENERATING METHOD USING THE SAME

BACKGROUND OF THE INVENTION

The present invention relates to a mechanical energy storage system and generating method using the same. More particularly, this invention relates to a mechanical energy storage system and generating method, which harvests energy easily, stores simply, and generates electricity conveniently.

Energy storage systems have been developed and introduced widely in the community. An explosive increase of mobile phones, smart phone, and other mobile devices and consumption of electrical energy in all aspects of human activities has made it outstanding using energy more effectively.

To solve the above problems, various types of technologies have been developed.

The technologies being used or under development include a pumping-up power generation, compressed-air-storing gas turbine technology, electrical energy storing technology, superconducting magnetic energy storing technology, flywheel energy storing technology, etc.

However, there are problems to solve or issues to improve a lot in the community of mobile devices and energy.

Accordingly, a need for a mechanical energy storage system and generating method has been present for a long time considering the expansive demands in the everyday life. This invention is directed to solve these problems and satisfy the long-felt need.

SUMMARY OF THE INVENTION

The flywheel energy-storing technology includes highly precise components for storing kinetic energy, and has technological difficulty in obtaining vacuum, superconducting magnetic-levitating contact-less bearing, and flywheel enduring high-speed rotation in order to increase the energy density.

Also, in order to be used to harvest energy from various sources, miniaturization of the technology is essential, but the above flywheel energy-storing technology has to be developed much more and has problems in order to be used as a miniaturized and efficient energy-storing device.

And, in the storing method, it converts the kinetic energy to electrical energy, and stores it as kinetic energy again, and then outputs it as an electrical energy.

Therefore, there is a limit for it to store directly various mechanical energy generated from various physical phenomena.

Thus, the present invention having a simple structure stores the mechanical energy first, and rapidly generates electricity by circulating the gas through controlling of the control valve of the gas from the reservoir, minimizing the mechanical loss and maximizing generating efficiency.

Therefore, it may be made easily from a small size to a large size, and by adjusting the gas pressure of the pressure vessel cylinder in its initial charging, an energy-storing device of variety and high energy density can be realized.

That is, the invention is to provide a mechanical energy storing device and method of generating electricity, in which, after the reacting force by the amount of volume of the piston rod moving the high pressure gas charged in the pressure vessel cylinder by the external mechanical force is stored as energy, the high pressure gas that the piston carries and retreats by the discharging of the reacting force is circulated and used as an energy source to power the gas generator, generating electricity for a given time period.

Therefore, the invention charges the sealed high pressure gas chamber with high pressure gas and enables to generate electricity as much as the stored mechanical energy, the reacting force of the piston rod obtained from the pressure of the charged high pressure gas, such that miniaturization of the generator is possible, the electricity may be generated for a given time period or at a needed moment after storing the mechanical energy, and it is possible to realize a portable generator of a small size with various generating capacity.

Especially, using a property of gas of compressed charging of a necessary amount of gas in a given specification of chamber, the energy efficiency by charged compressed amount and controlling of generating efficiency (generating hour) through controlling of the energy density by the compression pressure of the compressed air can be obtained.

The present invention contrives to solve the disadvantages of the prior art.

An object of the invention is to provide a mechanical energy storage system and method.

An aspect of the invention provide a mechanical energy storage system.

The mechanical energy storage system comprises a pressure vessel, a piston, a piston rod, a first check valve, a first tube path, a control valve, a gas generator, a second tube path, and a second check valve.

The pressure vessel is charged with a high pressure gas and sealed from outside.

The piston is installed in a cylinder chamber of the pressure vessel cylinder and divides sealingly the cylinder chamber into front and rear cylinder chambers.

The piston rod is installed sealingly from outside, penetrates the rear cylinder chamber of the piston, and is push-and-moved by an external mechanical force.

The first check valve provides the moving of the high pressure gas in a direction from the front cylinder chamber to the rear cylinder chamber for compression equilibrium of the high pressure gas according to the proceeding movement of the piston.

The first tube path is connected sealingly to the rear cylinder chamber for discharging stored energy of reacting force against compression by volume displacing amount due to the proceeding movement of the piston.

The control valve is installed in the first tube path for controlling speed and amount of discharged high pressure gas.

The gas generator is connected to the first tube path and powered by the high pressure gas moved by controlling the control valve.

The second tube path is connected sealingly so as to return the high pressure gas used to power the gas generator to the front cylinder chamber.

The second check valve is installed in the second tube path for preventing backflow of the high pressure gas to the gas generator.

All components are maintained to be sealed in a state of being sealed off from outside and being charged with the high pressure gas in a pressurized equilibrium.

The first tube path may be positioned so as not to be interfered by movement of the piston rod and connected to the rear cylinder chamber at a position which is not interfered by a maximum retreating position of the piston.

The second tube path may penetrate and be connected to at a front axial center position so as not to interfere a maximum proceeding position of the piston.

The first check valve may be disposed in the piston in a horizontal direction with respect to the piston rod where the first check valve does not interfere with the piston rod.

The first check valve may be provided in a third tube path connecting the first tube path and the second tube path, and the third tube path may be connected to an input-side tube path of the control valve and an output-side tube path of the second check valve installed in the second tube path.

The gas generator may comprise a housing, a gas engine, and a generator.

The housing includes first and second input ports connected to an output end of the first tube path and first and second output ports connected to an input end of the second tube path corresponding to the first and second input ports.

The gas engine includes: a cylinder shaft installed on both inner sides of the housing, having first and second cylinder chambers penetrating top and bottom orifices connecting the first and second input ports and the first and second output ports on both sides, and formed in such a way that first and second cylinders cross (by 90 degrees) each other distantly; first and second piston rods, each of which being formed by a piston sliding and moving in the respective first or second cylinder chamber by being pressurized by the high pressure gas and a rod protruding on both sides of the piston to outside sealingly with respect to the first and second cylinder chambers; and first and second ring bearing housings assembled so as to slide and move linearly outside the first and second cylinders and having a pair of cam bearings on both sides while engaging with both ends of the rods of the first and second piston rods respectively, wherein the first and second ring bearing housings synchronize and rotate the cylinder shaft by contact-and-rotating and moving linearly at the same time of cam surfaces (off-center inner wheels) on both sides formed in the housing by the cam bearings respectively through the linear movement of the first and second ring bearing housings.

The generator includes a stator core assembled and fixed to inner surface of the housing between first and second cylinders of the cylinder shaft, a stator having insulators on both sides that support and assemble the stator core, a rotor core assembled to the cylinder shaft corresponding to the stator, and magnet assembled to the rotor core.

The housing may comprise first and second side covers formed by the first and second input ports and the first and second output ports penetrating grooves formed inside, first and second cam rings having cam surfaces (off-center inner wheel) on inner surface and disposed inside facing the first and second side covers, and a central cover disposed between the first and second cam rings on both sides, and wherein each is assembled such that engaging surfaces among the first and second side covers, the first and second cam rings, and the central cover are sealed by a plurality of bolts engaging in the left and right positioned diagonally with respect to the central cover through a plurality of bolt holes bored correspondingly with O-rings inserted between the engaging surfaces.

The first and second cam rings may be installed with corresponding cam surface (off-center inner wheel) formed on the inner surface in directions opposite and diagonal to each other.

In the gas engine, when the high pressure gas moved under pressure through the first and second input ports of the first and second side covers is supplied through one of the top and bottom orifices connected to the first and second cylinder chambers on both sides, the first and second ring bearing housings rotate due to the linear movement of the first and second piston rods, and any one of these two is in a state of dead point where the cam bearings on both sides are aligned with a maximum cam surface (a cam surface closest to a center point) and a minimum cam surface (a cam surface farthest from the center point) of any one of the first and second cam rings, a pressure is applied to the first or second piston rod in which the cam bearings on both sides are positioned at a central cam surface the other one of the first and second cam rings and in a state of off-dead point, a rotation of the first or second ring bearing housing is obtained and at the same time the high pressure gas charged in the first and second cylinder chambers is discharged through the orifice on the other side by the linear movement of the first and second piston rods, obtaining alternating and continuous flow of the high pressure gas, and the first and second cylinders and each cam bearing of the first and second ring bearing housings rotating in sync with the first and second piston rods rotate a rotor of the generator and generate electricity continuously without nip angle stress with the off-center inner wheel of the first and second cam rings.

The top and bottom orifices connected to first and second cylinder chambers of the cylinder shaft may be connected with a pair of port-connecting oblong grooves buried in outer surface on both of axle end to be connected to the first and second input ports and the first and second output ports due to rotation and formed according to sections.

The rotor of the generator may be assembled with magnets formed in an arc shape in magnet grooves formed in four pieces on the outer surface of the rotor core respectively, and the rotor core may be divided into two parts and assembled by welding to the chamfer portion of center, and wherein the magnet grooves are formed as taper grooves with wide inside and narrow outside for preventing dislocation in a direction of centrifugal force due to the rotation of the cylinder shaft, and fixed by fixing magnet formed correspondingly without a divided portion by a slide gluing assembly in an axial direction.

The stator of the generator may comprise a stator core having assembling grooves formed evenly axially, a coil protrusion formed evenly for winding the coil, and insulators assembled to inner surface of the assembling grooves by assembling protrusions, and the stator core is inserted and fixed rotatably to a fixing groove installed inside the central cover using fixing protrusions protruding on the outer surface in axial directions.

Another aspect of the invention provides a method of generating electricity using a mechanical energy storage system.

The mechanical energy storage system includes a pressure vessel cylinder having a piston rod connected to a piston and protruding to outside sealingly, a sealing line connected to front and rear cylinder chambers partitioned by the piston through first and second tube paths, a gas generator disposed sealingly between the first tube path and the second tube path, a control valve formed in the first tube path connected to the rear cylinder chamber, and first and second check valves formed in the first and second tube paths.

The method comprises steps for:

a) charging high pressure gas in the sealing line;

b) producing mechanical energy of reacting force (cross-sectional area of piston rod x pressure in cylinder x stroke) of volume change from proceeding of the piston rod by pressurizing and moving the piston rod and the piston with external mechanical force through the high pressure gas;

c) storing the mechanical energy into circulation to the rear cylinder chamber by the first check valve in the sealing line of the section between the second check valve and the control valve for pressure equilibrium in the sealing line by the reacting force, the mechanical energy; and d) generating electricity by a stator by rotating a rotor of the gas generator through pressure equilibrium movement of the mechanical energy stored in the sealing line of the second check valve from the control valve of relatively low pressure by opening of the control valve.

The step d) may comprise a step for controlling moving amount and speed of the high pressure gas circulating by the sealing line by the control valve.

The advantages of the present invention are: (1) the mechanical energy storage system and method are simple and powerful in harvesting and converting mechanical energy; and (2) the mechanical energy storage system and method has a short reaction time.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

A mechanical energy storage system and method according to the invention is for storing a mechanical energy and generating electricity using the stored mechanical energy, which is small and can be used to charge portable digital devices such as smart phone, mobile phone, tablet PC, notebook, PMP, etc.

Below the invention is shown and described with reference to different embodiments referring to the figures, it will be appreciated by those skilled in the art that variations in form, detail, compositions and operation may be made without departing from the spirit and scope of the invention as defined by the accompanying claims.

And, the components shown in the figure in order to explain the invention may be shown in simplified, or exaggerated or omitted as long as they do not affect the range of the right of the invention.

Figure 1:
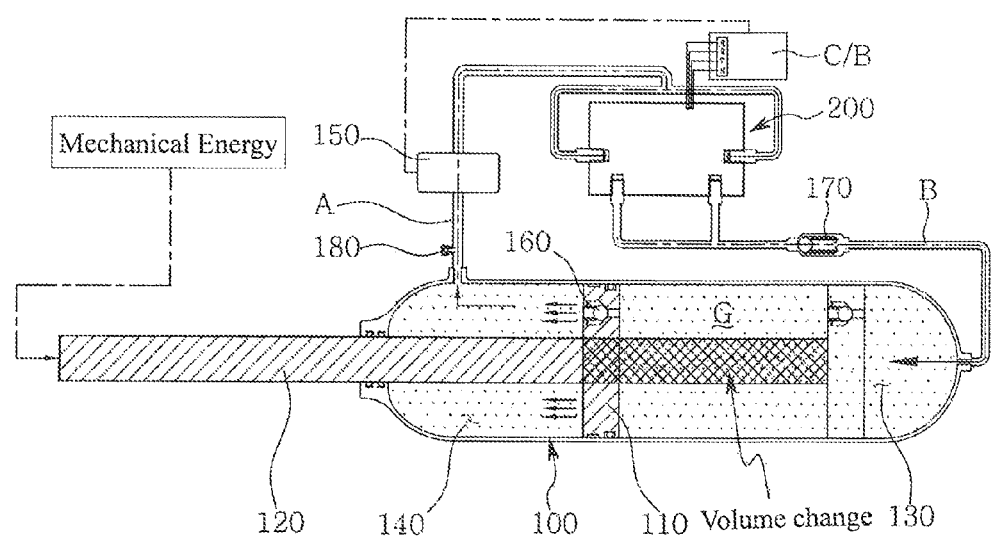
FIG. 1 is a schematic diagram showing a mechanical energy storage system according to an embodiment of the invention.

As shown in FIG. 1, an aspect of the invention provide a mechanical energy storage system.

The mechanical energy storage system comprises a pressure vessel cylinder (100), a piston (110), a piston rod (120), a first check valve (160), a first tube path (A), a control valve (150), a gas generator (200), a second tube path (B), and a second check valve (170).

The pressure vessel cylinder (100) is charged with a high pressure gas and sealed from outside. The pressure vessel cylinder (100) is connected to each components through the first tube path (A) and the second tube path (B) with the gas generator (200) as a center, and is sealed from the outside as long as it is not divided or disassembled forcefully. And, a gas injection port (180) is provided in one of the first tube path (A) and the second tube path (B), through which the high pressure gas (G) is charged.

Of course, the gas injection port (180) for charging or recharging for the loss of high pressure gas (G) charged inside due to long-term usage may be formed with a check valve.

The piston (110) is installed in a cylinder chamber of the pressure vessel cylinder (100) and divides sealingly the cylinder chamber into front and rear cylinder chambers.

The piston rod (120) is installed sealingly from outside, penetrates the rear cylinder chamber of the piston (110), and is push-and-moved by an external mechanical force. The piston rod (120) is formed integrally with or assembled with the piston (110) and protrudes to the outside. The piston rod (120) is exposed sealingly with the pressure vessel cylinder so as to be sealed with the cylinder chamber inside from repeated and pressurized proceeding and retreating movements by the mechanical force. And the mechanical force may be obtained by a grabbing force of human hand for an exemplary small capacity, or a force produced by variable-capacity fluid pressure pump connected to the wheel with the braking power produced while operating a car brake, explosion of gunpowder, etc. for an exemplary large capacity.

Here, the high pressure gas (G) charged in the cylinder chamber is in a state that the pressurized flow is blocked by the control valve (150), and through the pressurized movement of the piston (110) by the external mechanical force, the cylinder chambers of the pressure vessel cylinder (100), the front and rear cylinder chambers (130, 140) from the control valve (150) to the second check valve (170) and the sealing line of the first tube path (A) and the second tube path (B) connecting them store the reacting force against the compression of the high pressure gas by the volume displacement of the piston rod (120) as a stored energy.

The high pressure gas (G) due to the pressurized movement of the piston (110) is configured to moved in a direction from the front cylinder chamber (130) to the rear cylinder chamber (140) by the first check valve (160) formed in the piston (110) for the pressure equilibrium in the sealing line where a pressurized flow is possible.

And, the first tube path (A) discharges the stored energy by opening of the control valve (150), and powers the gas generator (200) using the discharged energy to generate electricity.

Here, the discharged stored energy is explained to be used a power to operate the gas generator (200) connected to a line in this invention, but if necessary it can be used as a power source to operate a device to be rotated.

The control valve (150) may be understood as a controller for controlling the amount and speed of discharging of the reacting force by the volume displacement proportional to the proceeding of the piston rod (120). As in the above, the high pressure gas (G) flowed through the second tube path (B) and used for generating electricity returns to the front cylinder chamber (130) of the pressure vessel cylinder (100) via the second check valve (170).

Here, the second check valve (170) prevents the high pressure gas (G) pressurized by storing energy from backflow toward a discharging line of the gas generator (200).

After using up the stored energy, the piston rod (120) can be proceed again to produce mechanical energy to be stored repeatedly.

The first tube path (A) may be positioned so as not to be interfered by movement of the piston rod (120) and connected to the rear cylinder chamber (140) at a position which is not interfered by a maximum retreating position of the piston (110).

Also, the second tube path (B) may penetrate and be connected to at a front axial center position so as not to interfere a maximum proceeding position of the piston (11)).

On the other hand, as a preferred embodiment of the invention, the first check valve (160) may be disposed in the piston (110) in a horizontal direction with respect to the piston rod (120) where the first check valve (160) does not interfere with the piston rod (120).

Figure 2:
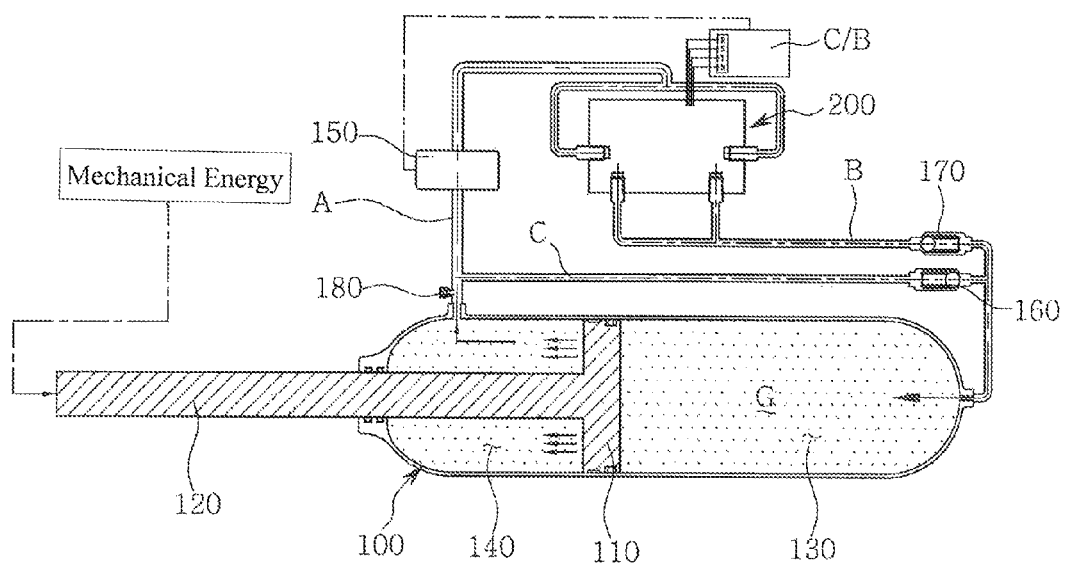
FIG. 2 is a schematic diagram showing a mechanical energy storage system according to another embodiment of the invention.

And, as shown in FIG. 2, the first check valve (160) may be provided in a third tube path (C) connecting the first tube path (A) and the second tube path (B).

Here, the third tube path (C) may be connected to an input-side tube path of the control valve (150) and an output-side tube path of the second check valve (170) installed in the second tube path (B).

The check valve (160) formed in the third tube path (C), as in a preferred embodiment, may be used for storing the mechanical energy (the amount of compressed volume due to the proceeding of the piston rod) as a stored energy of reacting force by the pressurized movement of the piston (110) in a state of pressure equilibrium by moving in the sealing line of the control valve (150) and the rear cylinder chamber (140) via the second tube path (B) and the third tube path (C).

On the other hand, each of the first check valve (160), the second check valve (170), and the gas injection port (180) used in the present may be realized by a ball check valve, which includes a body having a valve seat tilted with respect to the flow of fluid, a ball contacting the valve seat and blocking the flow of fluid, and a compression spring pushing forcefully the ball against the valve seat.

The gas generator (200) used in the invention generates electricity using the flow of the high pressure gas (G) (pressure equilibrium) as in the above.

Of course, the produced electricity may be used directly as a rotating power of a rotational device, or as a power to charge batteries.

Figure 3:
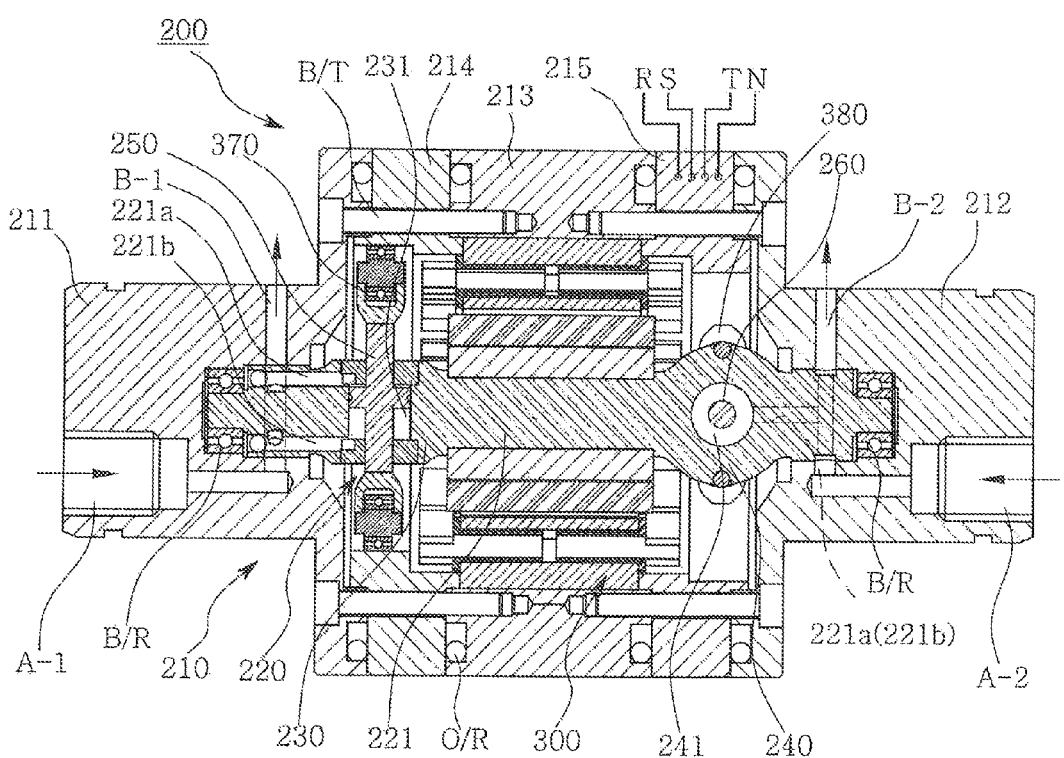
FIG. 3 is a cross-sectional view showing an assembled state of a gas generator, a component of the present invention.

The gas generator (200) used in the invention, as shown in FIG. 3, comprises a housing (210) receiving inner components sealingly, a gas engine (220) received in the housing (210), and a generator (300).

The housing (210) includes a first input port (A-1) and a second input port (A-2) connected to an output end of the first tube path (A) and first and second output ports (B-1 and B-2) connected to an input end of the second tube path (B) corresponding to the first and second input ports (A-1 and A-2).

Figure 4:
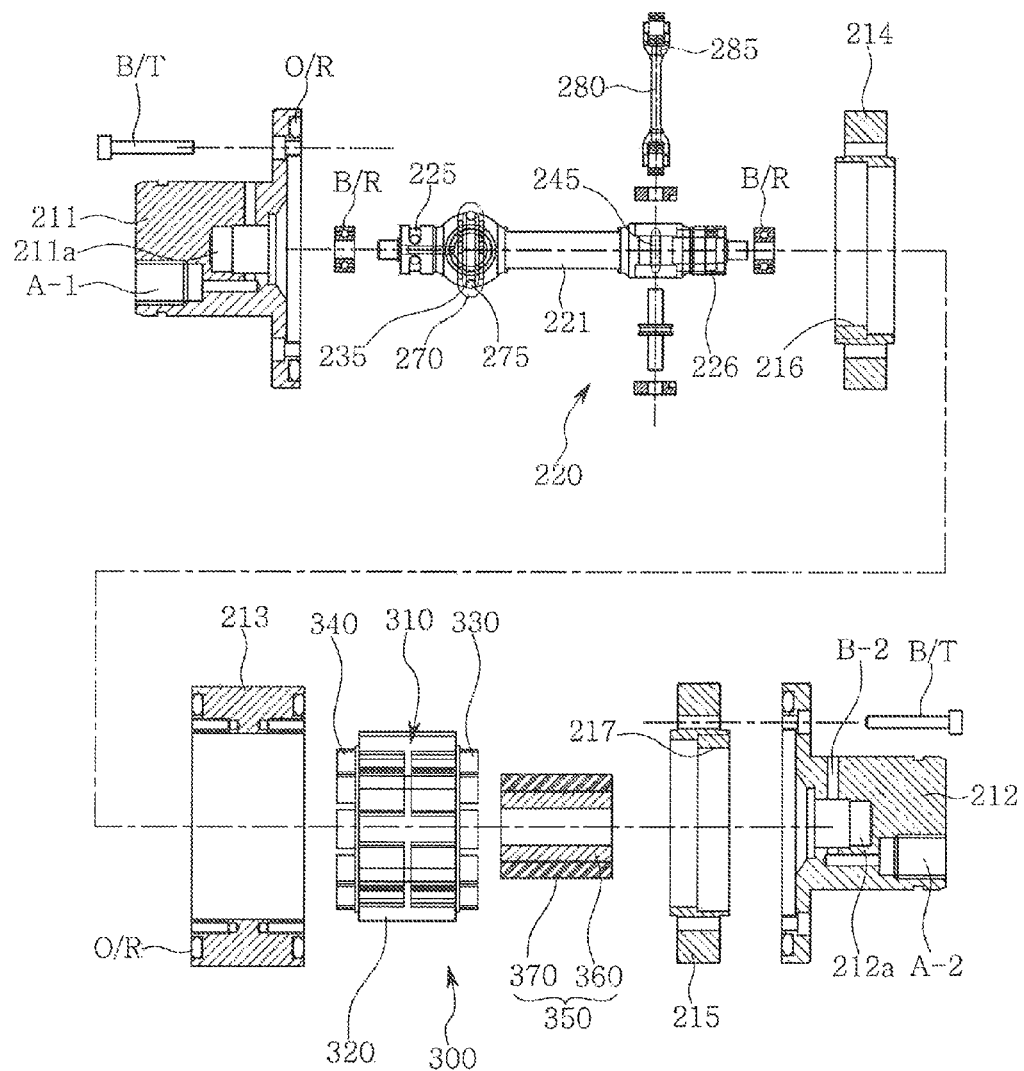
FIG. 4 is an exploded view showing components of FIG. 3.
Figure 5:
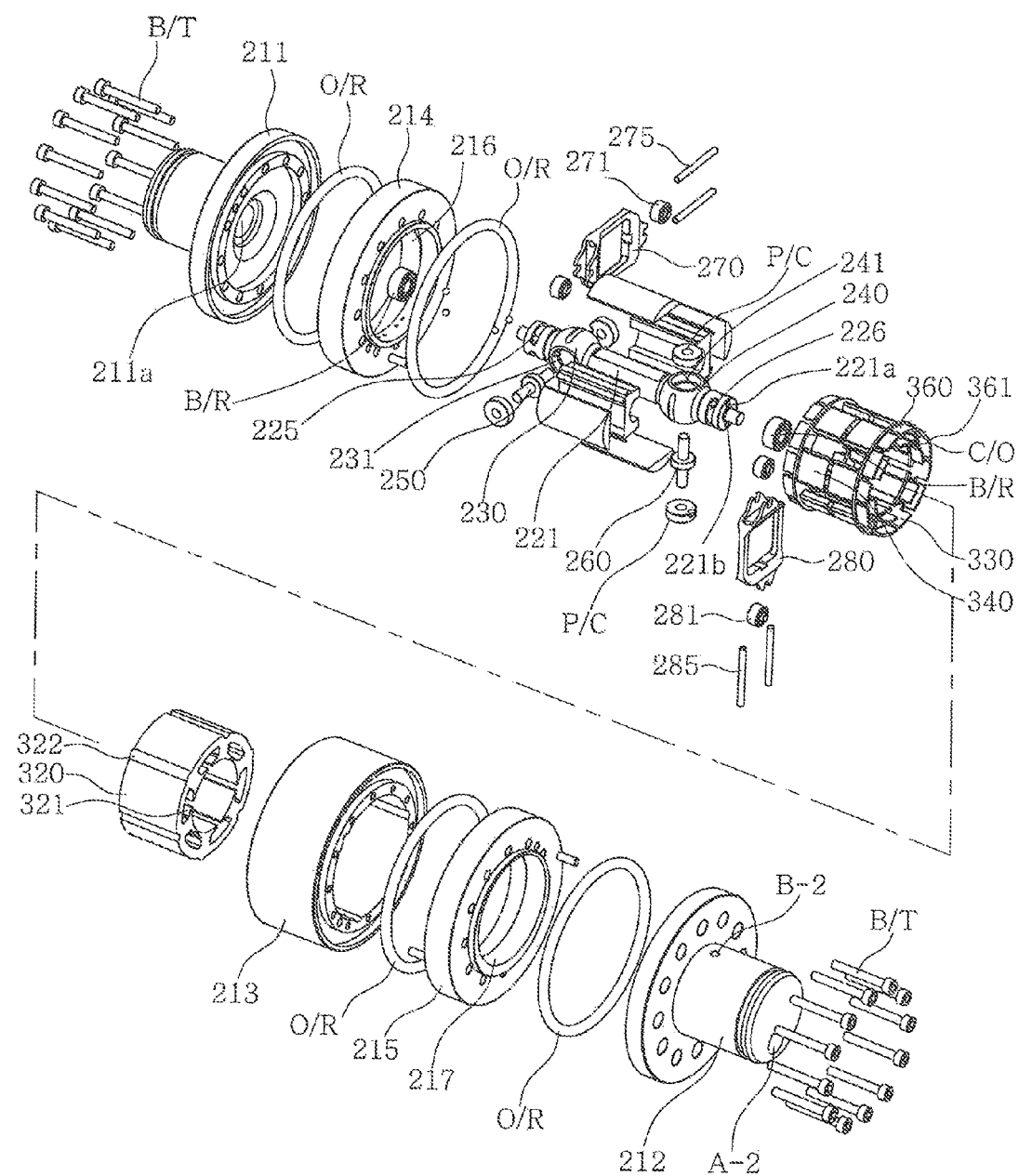
FIG. 5 is an exploded perspective view showing an outlook of the components of FIG. 3.

Explaining the housing (210) in details referring to FIG. 4, the housing (210) comprises first and second side covers (211, 212) penetrating the first and second input ports (A-1 and A-2) and the first and second output ports (B-1 and B-2) in internal axle grooves (211a, 212a), first and second cam rings (214, 215) forming corresponding cam surfaces (off-center inner wheels) (216, 217) and disposed inside facing the first and second side covers (211, 212), and a central cover (213) disposed between the first and second cam rings (214, 215) on both sides. Here, each of the first and second side covers (211, 212), the first and second cam rings (214, 215), and the central cover (213) is assembled with each of engaging surfaces sealed by fastening bolts (B/T) on the left and right in diagonal directions with respect to the central cover (213) as a center through a plurality of bolt holes bored correspondingly with O-rings inserted between O-ring grooves formed on the engaging surfaces.

Figure 10:
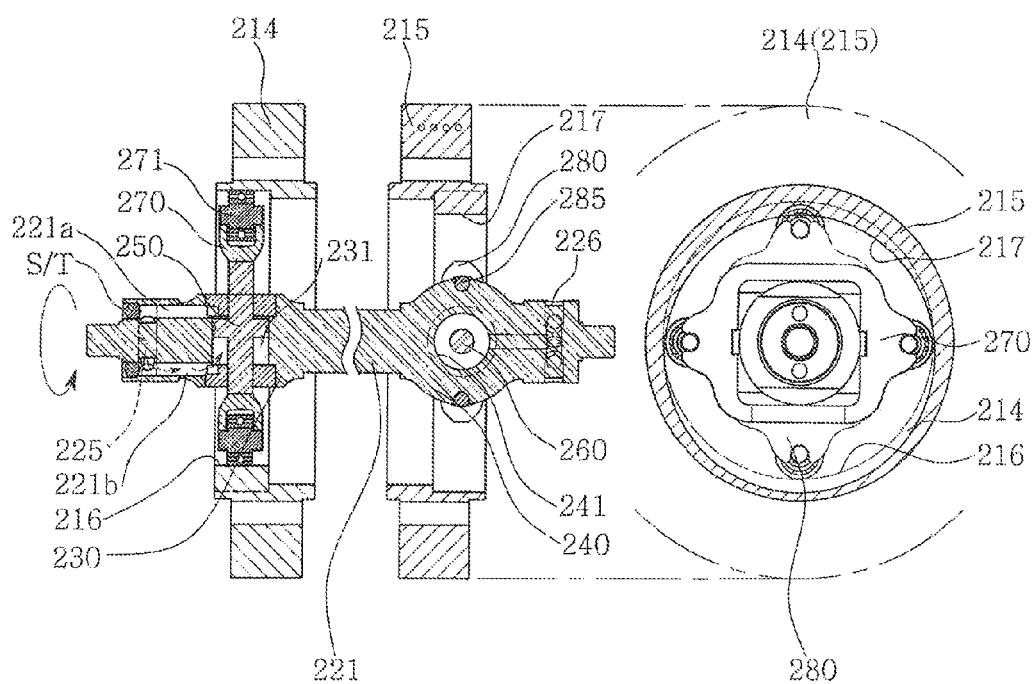
FIG. 10 is a sampled view showing a state of contacting and moving of cylinder shaft of gas engine and an off-center inner wheel of first and second cam rings for explaining the operation of the gas generator.

Here, the first and second cam rings (214, 215), as shown in FIG. 10, are preferably installed, such that the thickest surface of each cam surface (off-center inner wheel) (216, 217) formed gradually thickly in the inner surface with a distance shrunk at a center point is disposed oppositely.

Figure 6:
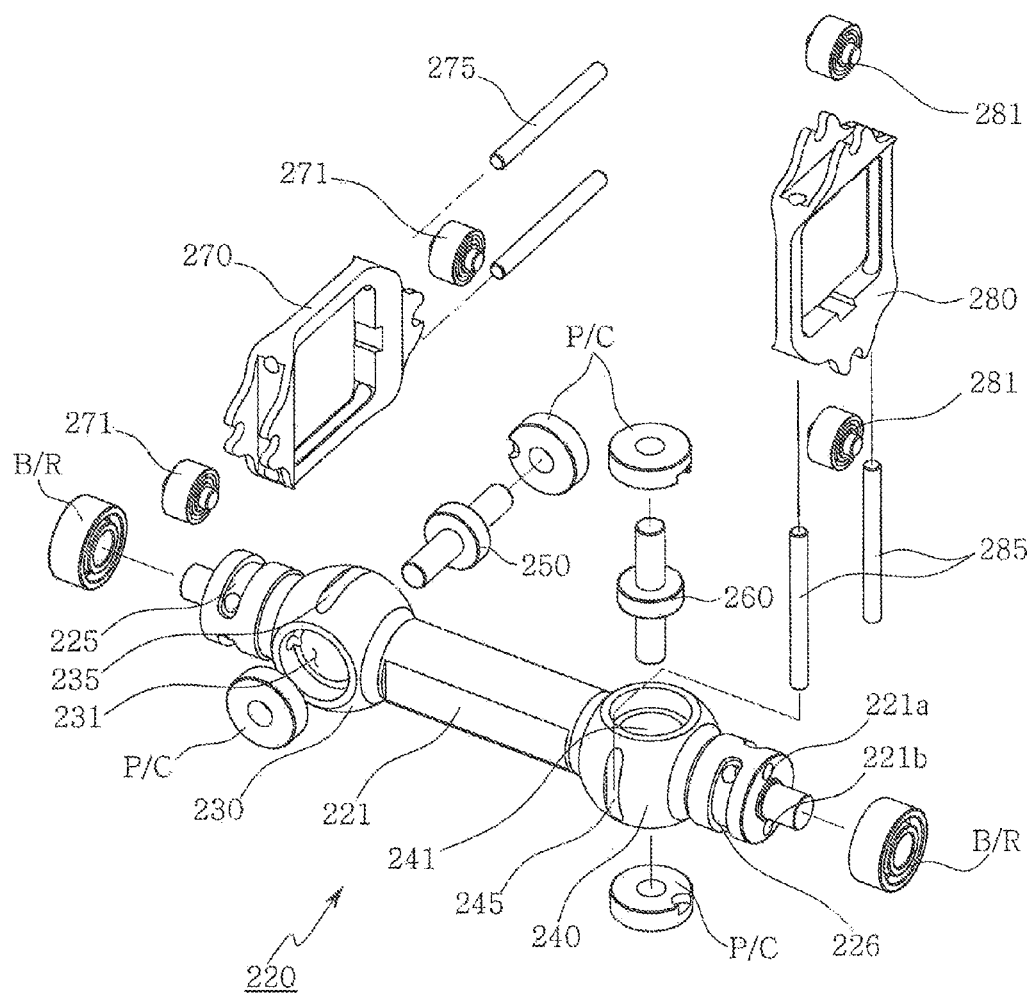
FIG. 6 and FIG. 7 are an exploded perspective view and an exploded cross-sectional view showing a gas generator of the present invention.
Figure 7:
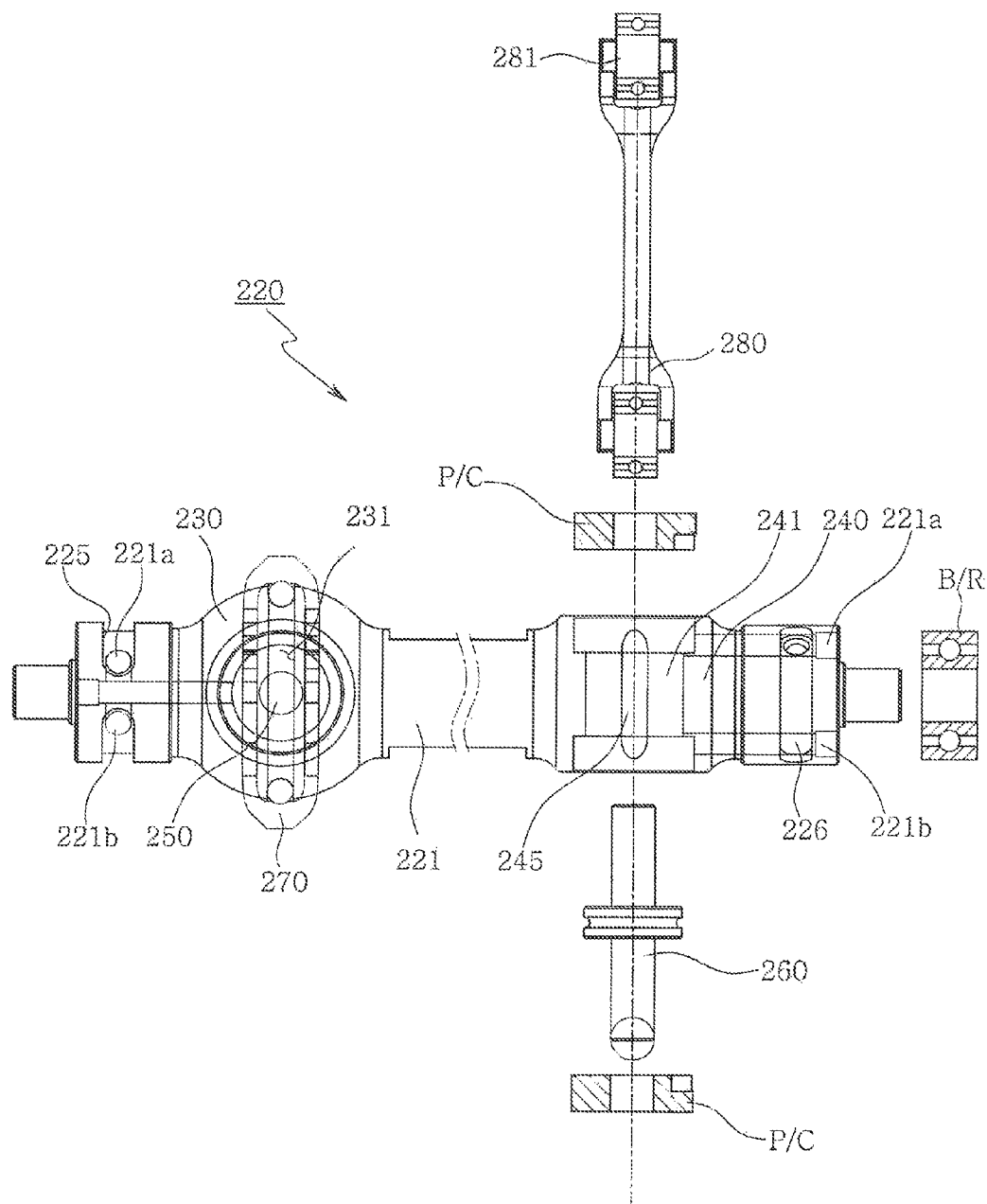

FIG. 6 and FIG. 7 are an exploded perspective view and an exploded cross-sectional view showing a gas generator of the present invention.

The gas engine (220) includes a cylinder shaft (221), both ends of which being installed on supporting bearings (B/R) assembled to the inner surface of the axle grooves (211a, 212a) of the side covers (211,212) of the housing (210), in which first and second cylinders (230, 240), having corresponding first and second cylinder chambers (231, 241) formed with top and bottom orifices (221a, 221b) (refer to FIGS. 6 and 7) connecting the first and second input ports (A-1 and A-2) and the first and second output ports (B-1 and B-2) penetrating at the top and bottom portions, cross (by 90 degrees) each other distantly.

The top and bottom orifices (221a, 221b) are perpendicular to the axle direction of the cylinder shaft (221), and formed penetrating in the axle direction, and the opening end of the axle end is finished sealingly by pressing on of conventional steel ball (S/T).

The cylinder shaft (221) comprises a pair of port-connecting oblong grooves (225) and port-connecting oblong groove (226) buried in outer surface on both of axle end and formed by sections, which are connected to opening ends of the top and bottom orifices (221a, 221b) connected to first and second cylinder chambers (231, 241), that is, to opening ends that cross perpendicularly with the axle direction of the cylinder shaft (221), so as to form connecting tube paths to the first and second input ports (A-1 and A-2) and the first and second output ports (B-1 and B-2) by rotation.

And, to the first and second cylinder chambers (231, 241) are engaged respective first and second piston rods (250, 260), which include a piston sliding and moving by pressure of the high pressure gas (G) and a rod formed on both side of the piston and protruding to outside sealingly from the first and second cylinder chambers (231, 241).

Here, the first and second cylinder chambers (231, 241) have respective piston caps (P/C) assembled and engaging to the top and bottom portions respectively for sealing the in and out operation of the rod of the first and second piston rods (250, 260).

And, outside the first and second cylinders (230, 240) are provided first and second ring bearing housings (270, 280) assembled to both sides of each rod of the first and second piston rods (250, 260) so as to slide and move linearly in the moving direction of the first and second piston rods (250, 260).

Here, the first and second ring bearing housings (270, 280) have a shape of rectangular ring and are assembled to guide grooves (235, 245) provided on both outsides of the first and second cylinders (230, 240) by a pair of guide poles (275, 285), so as to move linearly without disengaging.

In other words, the first and second ring bearing housings (270, 280) are inserted on the outer sides of the first and second cylinders (230, 240), and the pair of guide poles (275, 285) are assembled in a sliding direction to the guide grooves (235, 245) on both sides of the first and second cylinders (230, 240), to be assembled with a portion of the outer surface engaged to the guide grooves (235, 245).

Therefore, each of the first and second ring bearing housings (270, 280) is allowed to slide and move in the moving direction of the first and second piston rods (250, 260), but self-rotation is prevented and it is assembled so as not be disengaged.

Of course, by such an assembly, to grooves provided on the top and bottom inner surfaces of the first and second ring bearing housings (270, 280) are engaged and assembled both ends of rods of the first and second piston rods (250, 260), enabling both of them to move as one.

Here, the first and second ring bearing housings (270, 280) comprise a pair of cam bearings (271, 281), each of which is assembled by axle facing each other.

The cylinder shaft (221) is assembled by axle engagement to the housing (210) rotatably from a state of inscribing the each of cam bearings (271, 281) to each of the cam surfaces (off-center inner wheels) (216, 217) of the first and second cam rings (214, 215) to a state that the first and second piston rods (250, 260) and the first and second ring bearing housings (270,280) are set.

That is, both ends of the cylinder shaft (221) engage by axle with supporting bearings (B/R) engaging inner surface of the axle grooves (211a, 212a) of the first and second side covers (211, 212) of the housing (210).

Therefore, the cylinder shaft (221) moves first and second piston rods (250, 260) through the operation (linear movement by pressurized movement of the high pressure gas) of the first and second piston rods (250, 260) provided in the first and second cylinders (230, 240), and at the same time a rotational power (cam movement) of the first and second ring bearing housings (270,280) is generated, rotating the cylinder shaft (221) with synchronized rotation of the whole.

Figure 11:
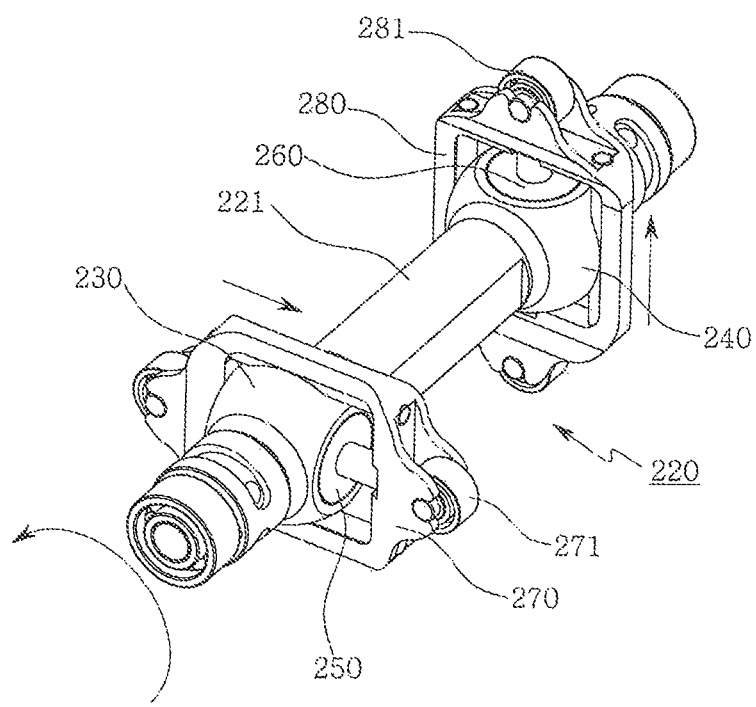
FIG. 11 and FIG. 12 are sampled perspective views showing a rotation state of a cylinder shaft forming the gas engine of the gas generator.
Figure 12:
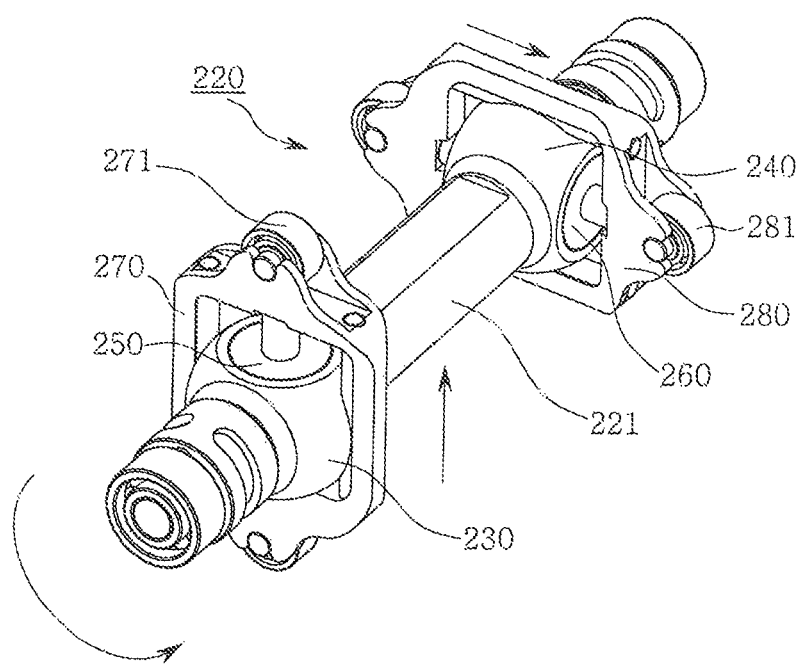
Figure 13:
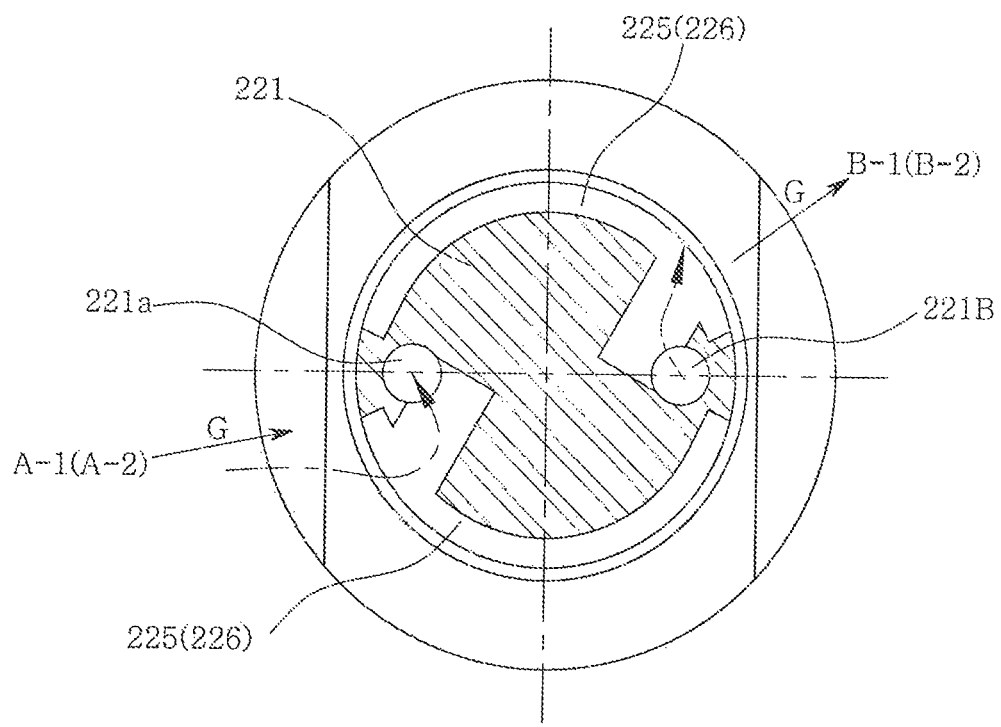
FIGS. 13 through 15 are sampled views of operation showing supplying of high pressure gas according to rotation of the cylinder shaft.

Considering such operations referring to FIGS. 10 through 15, as shown in FIG. 10 and FIG. 13, the high pressure gas (G) moving pressurized through first and second input ports (A-1 and A-2) of the first and second side covers (111, 112) imparts linear-proceeding pressure to the piston of the second piston rod (260) through one (the top orifice 221a for explanation), which is connected to any one of the port-connecting oblong grooves (225, 226), of first and second cylinder chambers (231, 241) of the cylinder shaft (221), and retreats the first piston rod (250) and the second piston rod (260).

Therefore, by providing sliding operational power in a direction to both cam bearings (271, 281) of first and second ring bearing housings (270,280) supported on both sides of such first and second piston rods (250, 260), each cam surface (off-center inner wheel) (216, 217) of the first and second cam rings (214, 215) is made to slide and rotate.

Figure 14:
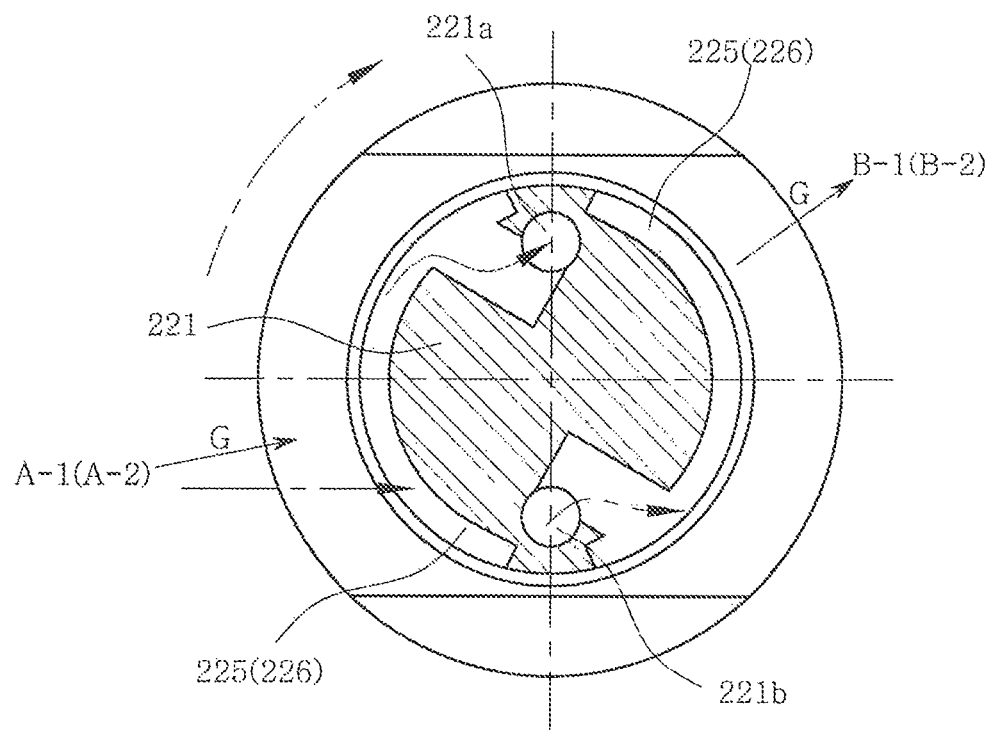

In such a sliding rotation, as shown in FIG. 14, the first or second piston rods (250 or 260) of one of the first or second cylinder chamber (231 or 241), which is moving under pressure, proceeds (retreats) to the maximum, and the first or second bearing housing (270 or 280) is in a state of dead point where the cam bearings (271 or 281) on both sides are aligned with a maximum cam surface (a cam surface closest to a center point) and a minimum cam surface (a cam surface farthest from the center point) of cam surface (off-center inner wheels) (216 or 217) of any one of the first and second cam rings (214 or 215), and the other one is in a state (middle retreating state) in which the cam bearings (271 or 281) on both sides are positioned at a central cam surface of the first or second cam ring (214 or 215).

In other words, since the other ring bearing housing (280 or 270) in a state crossing by 90 degrees with respect to the one ring bearing housing (270 or 280) in the location of deadpoint is located alternatingly in a state which is not in the deadpoint, one of the first and second piston rod (250 or 260) moved by pressure receives force to move (proceed or retreat) always in a state off the deadpoint, such that the first or second ring bearing housing (270 or 280) rotates continuously without malfunction from a nip angle stress.

In such a process, by the linear movement of the first and second piston rod (250, 260), the high pressure gas charged in the first and second cylinder chambers (231, 241) is discharged through the first and second output ports (B-1 and B-2) by respective port-connecting oblong groove connected to the other orifice (221b), resulting in a continuous flow.

Figure 15:
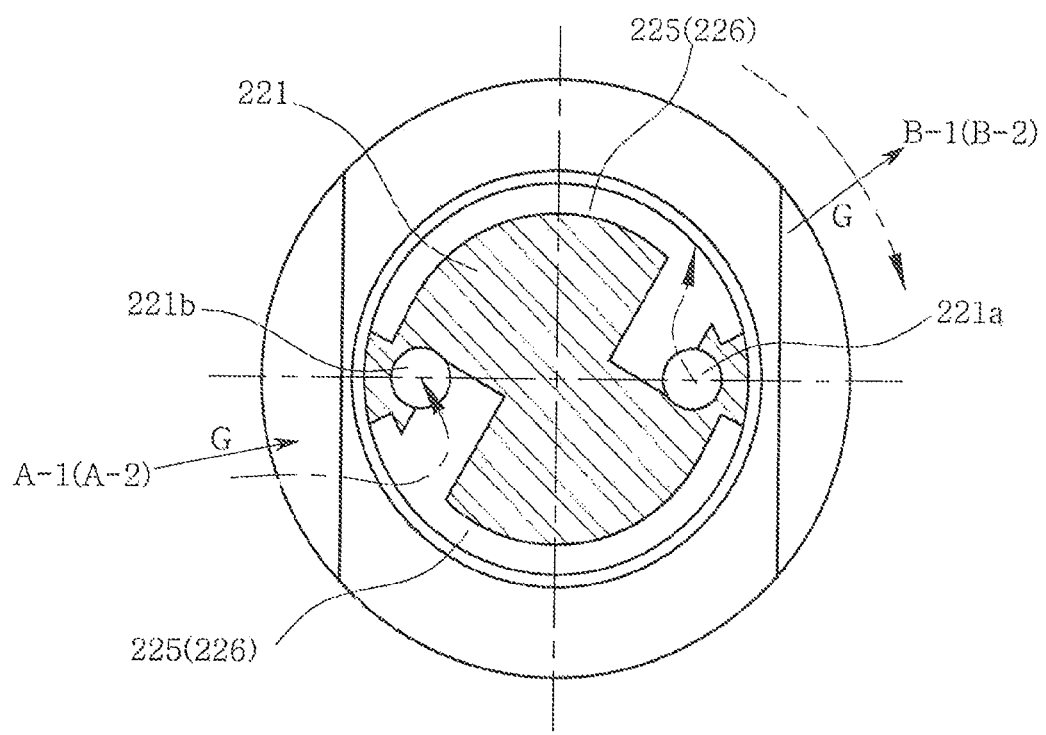

As the flow of the high pressure gas is achieved through the first and second output ports (B-1 and B-2) as such, as shown in FIG. 15, the port-connecting oblong grooves (225, 226) of the bottom orifice (221b) connected to the first or second output port (B-1 or B2) disengages the deadpoint positioned in the first or second input port (A-1 or A-2), and at the same time, oppositely, the port-connecting oblong grooves (225, 226) of the top orifice (221a) connected to the first or second input port (A-1 or A-2) is alternatingly connected to the first or second output port (B-1 or B-2), such that the high pressure gas moving by pressure through the first and second input ports (A-1 and A-2) is discharged through the first and second output ports (B-1 and B-2), and the cylinder shaft (221) obtains continuous rotation by pressurized movement of the high pressure gas by the stored mechanical energy.

In other words, the top and bottom orifices (221a, 221b) penetrating the first and second cylinder chambers (231, 241) of the cylinder shaft (221) are alternately connected to the first and second input ports (A-1 and A-2) and the first and second output ports (B-1 and B2), move the high pressure gas by pressure, and rotates the cylinder shaft (221) continuously.

By such a process, all the components including the cylinder shaft (221), the first and second first and second piston rods (250, 260), and the first and second first and second ring bearing housings (270,280) rotate synchronously.

That is, as shown in FIGS. 11 and 12, since the first and second first and second ring bearing housings (270,280) installed according to a concept of one body with the first and second cylinders (230, 240) are disposed with 90 degrees crossing distantly, when any one of the first and second cam bearings (271, 281) of the first and second ring bearing housings (270,280) are located at the maximum cam surface (cam surface closest to center point), a deadpoint of the cam surfaces (off-center inner wheels) (216, 217), and the minimum cam surface (cam surface farthest from the center point) by the linear movement (proceeding or retreating) of the first and second piston rods (250, 260) installed in the first and second cylinder chambers (231, 241) of the first and second cylinders (230, 240), the other one escapes the deadpoint, receives pressure of rotational movement, and thus the continuous sliding movement in a direction is obtained.

Therefore, the first and second cam bearings (271, 281) following the sliding movement rotate the cylinder shaft (221) without a nip angle stress to each of the cam surfaces (off-center inner wheels) of the first and second cam rings (214, 215), generating electricity by the generator (300).

On the other hand, the gas generator (200) may connect the output end of the first tube path (A) connected to the first and second input ports (A-1 and A-2) to the first and second output ports (B-1 and B-2), and to the first and second output ports (B-1 and B-2) can be changed and connected the input end of the second tube path (B) without any problem in operation.

Figure 8:
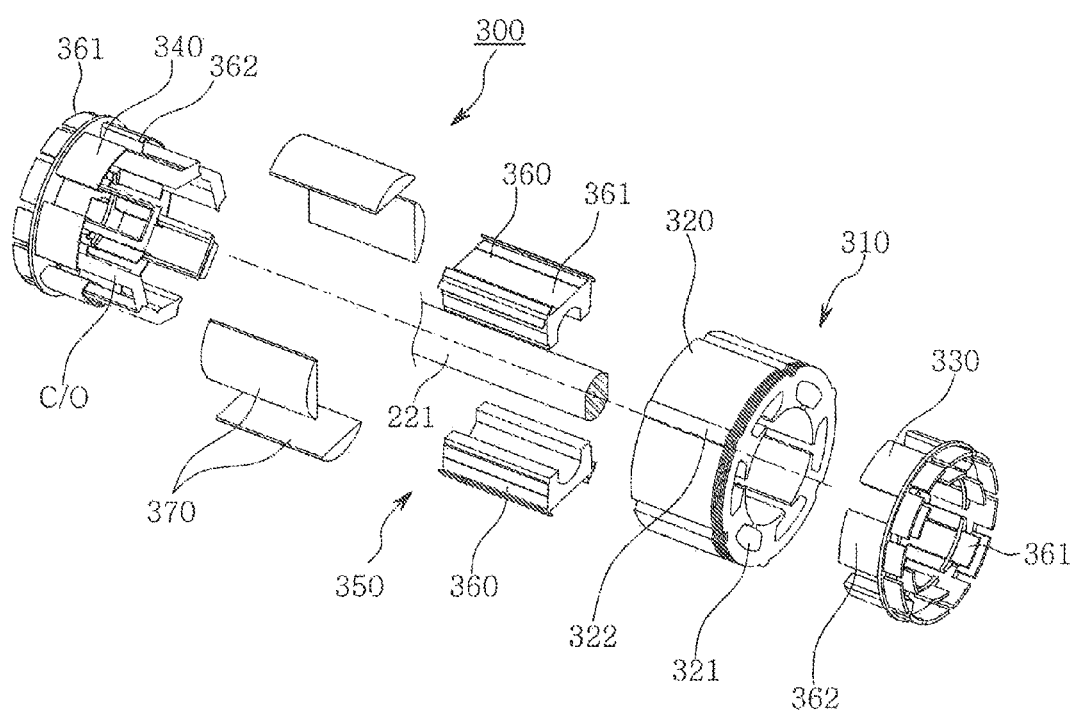
FIG. 8 and FIG. 9 are an exploded perspective view and a cross-sectional view of an assembled state of a generator of a gas generator of the present invention.
Figure 9:
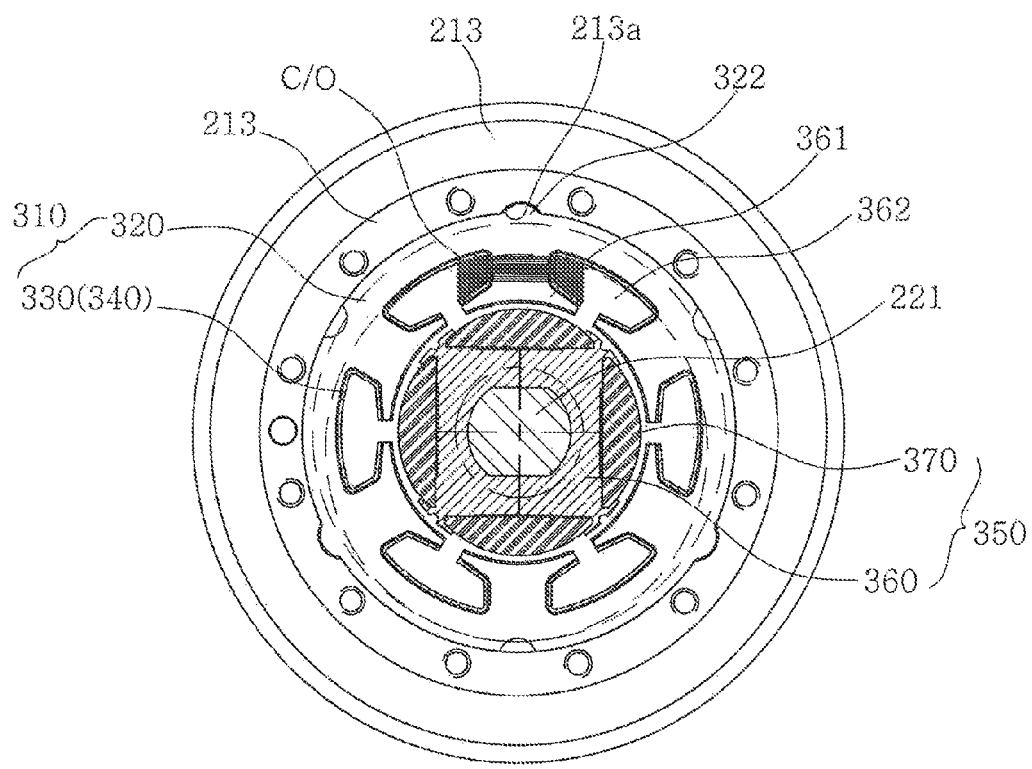

FIG. 8 and FIG. 9 are an exploded perspective view and a cross-sectional view of an assembled state of a generator of a gas generator of the present invention.

Such a generator (300) includes a stator core (320) assembled and fixed to inner surface of the central cover (213) of the housing (210) between first and second cylinders (230, 240) of the cylinder shaft (221), a stator (310) having insulators (330, 340) on both sides that support and assemble the stator core (320), a rotor core (360) assembled to a central axle portion of the cylinder shaft (221) corresponding to the stator (310), and magnet (370) assembled to the rotor core (360).

The rotor (350) may be assembled with magnets (370) formed in an arc shape in magnet grooves (361) formed in four pieces on the outer surface of the rotor core (360) respectively, and the rotor core (360) may be divided into two parts and assembled by contacting and welding to the chamfer portion chamfered to the center portion, so as to rotate in sync with the cylinder shaft (221).

Here, the magnet grooves (361) of the rotor core (360) are formed as taper grooves with wide inside and narrow outside for preventing dislocation in a direction of centrifugal force due to the rotation of the cylinder shaft (221), and there the magnet grooves (361) are formed, to which the magnet (370) is assembled.

Such a rotor core (360) is provided as two pieces in order to assemble to the central axle portion of the cylinder shaft (221), and for assembly, after attaching two surfaces by welding while contacting to the chamfer portion of the central axle portion of the cylinder shaft (221), four magnets (370) are assembled to the four magnet grooves (361).

Here, the magnet grooves (361) of the rotor core (360) are formed as taper grooves with wide inside and narrow outside for preventing dislocation in a direction of centrifugal force due to the rotation of the cylinder shaft (221), to which the magnet (370) made fit there is assembled.

Also, the stator core (320) of the stator (310) of the generator is provided with assembling groove (321) formed evenly in an axle direction, and in the insulators (330, 340) a pair of coil protrusions for winding coils (C/O) are formed evenly, and assembled to the inner surface of the assembling groove (321) of the stator core (320), forming fastening protrusion (362).

Such stator core (310) is inserted and fixed rotatably to a fixing groove (213a) installed inside the central cover (213) using fixing protrusions (322) protruding on the outer surface in axial directions.

The stator core (320) is provided by laminating silicon steel plates of 0.5 mm and welding them into one body with laser, and such a manufacturing of the stator core (320) is well known to the art, the details of which being omitted here.

And, the electricity generated in the generator (300), that is the alternating current of RSTN phase from the stator (310), may be rectified into DC level by an external controller (C/B) to be used.

The mechanical energy storage system according to the invention can be explained in detail referring to FIG. 1.

Another aspect of the invention provides a method of generating electricity using a mechanical energy storage system, which comprises a pressure vessel cylinder (100), a piston rod (120) exposed sealingly to an inner cylinder chamber so as to pressurize and move a piston (110) by external mechanical force, a first check valve (160) providing movement of high pressure gas from a front cylinder chamber to a rear cylinder chamber partitioned by the pressure vessel cylinder (100) for pressure equilibrium of the high pressure gas charged inside due to proceeding movement of the piston (110), a first tube path (A) connected sealingly to the rear cylinder chamber so as to discharge stored energy of reacting force by compression by the amount of volume displacement of the piston rod (120) due to the proceeding movement of the piston (110), a control valve (150) installed in the first tube path (A) and controlling the speed and amount of the discharged high pressure gas, a gas generator (200) connected to the first tube path (A) and powered by the high pressure gas (G) moving by the control of the control valve (150), a second tube path (B) connected sealingly so as to return the high pressure gas (G) used as an operational power of the gas generator (200) to the front cylinder chamber, and a sealed pressure line in a state that the high pressure gas is charged with the pressure equilibrium inside while a second check valve (170) installed in the second tube path (B) and for preventing backflow of the high pressure gas to the gas generator (200) is sealed off the outside, comprises steps for charging the high pressure gas, generating energy by external mechanical energy, storing the produced mechanical energy, and generating electricity using the stored mechanical energy.

The step for charging the high pressure gas comprises a step for charging the high pressure gas (G) in the sealed pressure line. For such charging of the high pressure gas, a gas injection port (180) is provided in the first tube path (A) connected to the rear cylinder chamber of the pressure vessel cylinder (100) with the control valve (150) opened and the high pressure gas (G) is charged over the entire sealed pressure line. And the high pressure gas charged in the sealed pressure line may be preferably nitrogen gas, which gives maximum pressurized charging in a give spec of sealed space.

Next the step for generating mechanical energy comprises a step for producing mechanical energy of reacting force (cross-sectional area of piston rod x pressure in cylinder x stroke) of volume change from proceeding of the piston rod (120) by pressurizing and moving the piston rod (120) and the piston (110) with external mechanical force through the high pressure gas (G).

In a case to provide a small-capacity of mobile device using the sealed pressure line of the invention, the grabbing force of human hands would provide the mechanical energy.

Also, in case of large-capacity of device, the mechanical energy may be supplied by the braking energy of wheels produced in the operation of brakes of cars or electric cars.

The step for storing the produced mechanical energy comprises a step for storing the mechanical energy into circulation to the rear cylinder chamber by the first check valve (160) in the sealing line of the section between the second check valve (170) and the control valve (150) for pressure equilibrium in the sealing line by the reacting force, the mechanical energy.

That is, the high pressure gas (G) pressurized by the amount of volume increased by the proceeding movement of the piston rod (120) by the external mechanical energy is stored by the pressure equilibrium obtained by the opening of the check valve (160).

The step for generating electricity using the stored mechanical energy comprises a step for rotating a rotor (350) of the gas generator (200) by a pressure equilibrium movement from the control valve (150) of relatively low pressure to a sealing line of the second check valve through the opening of the control valve (150), generating electricity by a stator (310) by pressurized movement, and at the same time returning (retreating) of the piston (110) and the piston rod (120).

Here, the flow of the high pressure gas for pressure equilibrium may be used to generate electricity by operating the gas generator (200), or to operate as a power source for a separate device.

The present invention may harvest and store dissipative mechanical energy produced in various industry and if necessary the stored energy can be used to generate electricity for charging or other operational power.

What is claimed is:

1. A mechanical energy storage system comprising:
a pressure vessel cylinder charged with a high pressure gas and sealed from outside;
a piston installed in a cylinder chamber of the pressure vessel cylinder and dividing sealingly the cylinder chamber into front and rear cylinder chambers;
a piston rod installed sealingly from outside penetrating the rear cylinder chamber of the piston and push-and-moved by an external mechanical force;
a first check valve providing the moving of the high pressure gas in a direction from the front cylinder chamber to the rear cylinder chamber for compression equilibrium of the high pressure gas according to the proceeding movement of the piston;
a first tube path connected sealingly to the rear cylinder chamber for discharging stored energy of reacting force against compression by volume displacing amount due to the proceeding movement of the piston;
a control valve installed in the first tube path for controlling speed and amount of discharged high pressure gas;
a gas generator connected to the first tube path and powered by the high pressure gas moved by controlling the control valve;
a second tube path connected sealingly so as to return the high pressure gas used to power the gas generator to the front cylinder chamber; and
a second check valve installed in the second tube path for preventing backflow of the high pressure gas to the gas generator,
wherein all components are maintained to be sealed in a state of being sealed off from outside and being charged with the high pressure gas in a pressurized equilibrium.

2. The mechanical energy storage system of claim 1, wherein the first tube path is positioned so as not to be interfered by movement of the piston rod and connected to the rear cylinder chamber at a position which is not interfered by a maximum retreating position of the piston.

3. The mechanical energy storage system of claim 1, wherein the second tube path penetrates and is connected to at a front axial center position so as not to interfere a maximum proceeding position of the piston.

4. The mechanical energy storage system of claim 1, wherein the first check valve is disposed in the piston in a horizontal direction with respect to the piston rod where the first check valve does not interfere with the piston rod.

5. The mechanical energy storage system of claim 4, wherein the first check valve is provided in a third tube path connecting the first tube path and the second tube path, wherein the third tube path is connected to an input-side tube path of the control valve and an output-side tube path of the second check valve installed in the second tube path.

6. The mechanical energy storage system of claim 1, wherein the gas generator comprises:
a housing including first and second input ports connected to an output end of the first tube path and first and second output ports connected to an input end of the second tube path corresponding to the first and second input ports;
a gas engine including: a cylinder shaft installed on both inner sides of the housing, having first and second cylinder chambers penetrating top and bottom orifices connecting the first and second input ports and the first and second output ports on both sides, and formed in such a way that first and second cylinders cross (by 90 degrees) each other distantly; first and second piston rods, each of which being formed by a piston sliding and moving in the respective first or second cylinder chamber by being pressurized by the high pressure gas and a rod protruding on both sides of the piston to outside sealingly with respect to the first and second cylinder chambers; and first and second ring bearing housings assembled so as to slide and move linearly outside the first and second cylinders and having a pair of cam bearings on both sides while engaging with both ends of the rods of the first and second piston rods respectively, wherein the first and second ring bearing housings synchronize and rotate the cylinder shaft by contact-and-rotating and moving linearly at the same time of cam surfaces (off-center inner wheels) on both sides formed in the housing by the cam bearings respectively through the linear movement of the first and second ring bearing housings; and
a generator including a stator core assembled and fixed to inner surface of the housing between first and second cylinders of the cylinder shaft, a stator having insulators on both sides that support and assemble the stator core, a rotor core assembled to the cylinder shaft corresponding to the stator, and magnet assembled to the rotor core.

7. The mechanical energy storage system of claim 6, wherein the housing comprises first and second side covers formed by the first and second input ports and the first and second output ports penetrating grooves formed inside, first and second cam rings having cam surfaces (off-center inner wheel) on inner surface and disposed inside facing the first and second side covers, and a central cover disposed between the first and second cam rings on both sides, and wherein each is assembled such that engaging surfaces among the first and second side covers, the first and second cam rings, and the central cover are sealed by a plurality of bolts engaging in the left and right positioned diagonally with respect to the central cover through a plurality of bolt holes bored correspondingly with O-rings inserted between the engaging surfaces.

8. The mechanical energy storage system of claim 7, wherein the first and second cam rings is installed with corresponding cam surface (off-center inner wheel) formed on the inner surface in directions opposite and diagonal to each other.

9. The mechanical energy storage system of claim 6, wherein, in the gas engine, when the high pressure gas moved under pressure through the first and second input ports of the first and second side covers is supplied through one of the top and bottom orifices connected to the first and second cylinder chambers on both sides, the first and second ring bearing housings rotate due to the linear movement of the first and second piston rods, and any one of these two is in a state of dead point where the cam bearings on both sides are aligned with a maximum cam surface (a cam surface closest to a center point) and a minimum cam surface (a cam surface farthest from the center point) of any one of the first and second cam rings, a pressure is applied to the first or second piston rod in which the cam bearings on both sides are positioned at a central cam surface the other one of the first and second cam rings and in a state of off-dead point, a rotation of the first or second ring bearing housing is obtained and at the same time the high pressure gas charged in the first and second cylinder chambers is discharged through the orifice on the other side by the linear movement of the first and second piston rods, obtaining alternating and continuous flow of the high pressure gas, and the first and second cylinders and each cam bearing of the first and second ring bearing housings rotating in sync with the first and second piston rods rotate a rotor of the generator and generate electricity continuously without nip angle stress with the off-center inner wheel of the first and second cam rings.

10. The mechanical energy storage system of claim 9, wherein the top and bottom orifices connected to first and second cylinder chambers of the cylinder shaft are connected with a pair of port-connecting oblong grooves buried in outer surface on both of axle end to be connected to the first and second input ports and the first and second output ports due to rotation and formed according to sections.

11. The mechanical energy storage system of claim 6, wherein the rotor of the generator are assembled with magnets formed in an arc shape in magnet grooves formed in four pieces on the outer surface of the rotor core respectively, and the rotor core is divided into two parts and assembled by welding to the chamfer portion of center, and wherein the magnet grooves are formed as taper grooves with wide inside and narrow outside for preventing dislocation in a direction of centrifugal force due to the rotation of the cylinder shaft, and fixed by fixing magnet formed correspondingly without a divided portion by a slide gluing assembly in an axial direction.

12. The mechanical energy storage system of claim 6, wherein the stator of the generator comprises a stator core having assembling grooves formed evenly axially, a coil protrusion formed evenly for winding the coil, and insulators assembled to inner surface of the assembling grooves by assembling protrusions, wherein the stator core is inserted and fixed rotatably to a fixing groove installed inside the central cover using fixing protrusions protruding on the outer surface in axial directions.

13. A method of generating electricity using a mechanical energy storage system including a pressure vessel cylinder having a piston rod connected to a piston and protruding to outside sealingly, a sealing line connected to front and rear cylinder chambers partitioned by the piston through first and second tube paths, a gas generator disposed sealingly between the first tube path and the second tube path, a control valve formed in the first tube path connected to the rear cylinder chamber, and first and second check valves formed in the first and second tube paths, the method comprising steps for:
   a) charging high pressure gas in the sealing line;
   b) producing mechanical energy of reacting force (cross-sectional area of piston rod x pressure in cylinder x stroke) of volume change from proceeding of the piston rod by pressurizing and moving the piston rod and the piston with external mechanical force through the high pressure gas;
   c) storing the mechanical energy into circulation to the rear cylinder chamber by the first check valve in the sealing line of the section between the second check valve and the control valve for pressure equilibrium in the sealing line by the reacting force, the mechanical energy; and
   d) generating electricity by a stator by rotating a rotor of the gas generator through pressure equilibrium movement of the mechanical energy stored in the sealing line of the second check valve from the control valve of relatively low pressure by opening of the control valve.

14. The method of claim 13, wherein the step d) comprises a step for controlling moving amount and speed of the high pressure gas circulating by the sealing line by the control valve.

\* \* \* \* \*